United States Patent [19]
Yamaguchi et al.

[11] 3,958,044
[45] May 18, 1976

[54] METHOD FOR COATING INORGANIC COMPOUNDS IN POWDERED FORM

[75] Inventors: Tadashi Yamaguchi; Takayuki Ono; Hirobumi Tanaka, all of Sendai; Hiroshi Hoshi, Narashino; Michio Hirakawa; Isao Watanabe, both of Ichikawa, all of Japan

[73] Assignee: Lion Yushi Kabushiki Kaisha, Tokyo, Japan

[22] Filed: Feb. 1, 1974

[21] Appl. No.: 438,533

[30] Foreign Application Priority Data
Feb. 3, 1973   Japan................................ 48-13919
Feb. 3, 1973   Japan................................ 48-13921

[52] U.S. Cl................................. 427/221; 428/407
[51] Int. Cl.²................................ B05D 7/00
[58] Field of Search........ 117/100 S, 100 B, 100 M; 260/42.53; 427/221

[56] References Cited
UNITED STATES PATENTS

| | | |
|---|---|---|
| 2,870,041 | 1/1959 | Waddle et al..................... 117/62.1 |
| 2,928,758 | 3/1960 | Waddle et al..................... 117/62.1 |
| 3,027,270 | 3/1962 | Cotton.............................. 117/62.1 |
| 3,157,527 | 11/1964 | Fournet et al. ................. 117/106 R |
| 3,330,693 | 7/1967 | Rumberger....................... 117/100 |
| 3,448,073 | 6/1969 | McManimie..................... 260/42.53 |
| 3,468,828 | 9/1969 | Perrins et al..................... 260/42.53 |
| 3,544,500 | 12/1970 | Osmond et al................. 117/100 B |
| 3,661,620 | 5/1972 | Dekking......................... 117/100 B |

Primary Examiner—Harry J. Gwinnell
Assistant Examiner—Dennis C. Konopacki
Attorney, Agent, or Firm—William J. Daniel

[57] ABSTRACT

A transition metal compound in powdered form or a mixture of a transition metal compound and other inorganic compounds in powdered form can be effectively coated with a polymer by contacting such powder with a vinyl monomer in the presence of hydrogen sulfite ions ($HSO_3^-$).

7 Claims, No Drawings

METHOD FOR COATING INORGANIC COMPOUNDS IN POWDERED FORM

BACKGROUND OF THE INVENTION

This invention relates to an improved process for preparing composite materials by coating a powder of an inorganic substance with a polymer.

Various methods for coating powdery inorganic materials with organic polymers by means of in situ polymerization have heretofore been proposed. For example, U.S. Pat. No. 3,330,693 discloses a method for coating the surface of iron oxide powder with polyethylene in an aqueous medium, and British Pat. No. 1,156,653 discloses a method for coating the surface of red iron oxide, indigo red or titanium oxide powder with a copolymer of methyl methacrylate and methacrylic acid in petroleum ether. Further, Japanese Pat. No. 302,461 discloses a method for preparing compositions comprising a pigment and a polymeric substance by polymerizing a monomer in the presence of various kinds of pigments with the aid of a catalytic system.

In each of these known methods, however, the polymerization of the monomer proceeds predominantly in the reaction medium rather than on the surface of the particles of the inorganic compound and, therefore, the amount of the polymer actually coated on the particles is very small and the bulk of the polymer does not participate in the coating. In short, each of these known methods is defective in that the ratio of the coated polymer to the total of the available polymer is very low.

BRIEF SUMMARY OF THE INVENTION

It is, therefore, a primary object of this invention to provide an effective method for coating the surface of powdery inorganic substances with a polymeric material.

Another object of this invention is to provide a method for coating a powdery transition metal compound with a polymer in which a vinyl monomer is polymerized selectively on the surface of particles of the transition metal compound by utilizing the transition metal compound per se as one component of the polymerization catalyst system.

A further object of this invention is to provide an effective method for coating the surface of a powdery inorganic substance with a polymer in which particles of an inorganic substance which are capable of participating in the polymerization catalyst system are associated with particles of the transition metal compound.

Other and further objects, features and advantages of this invention will appear more fully from the following description.

DETAILED DESCRIPTION OF THE INVENTION

The term "transition metal compound" as used herein means a compound selected from the class consisting of metals of the group ranging from Sc having an atomic number of 21 to Zn having an atomic number of 30, metals of the groups ranging from Y having an atomic number of 39 to Cd having an atomic number of 48 and metals of the group ranging from La having an atomic number of 57 to Hg having an atomic number of 80.

The term "vinyl monomer" as used herein means a monomer that can be vinyl-polymerized in the presence of a radical polymerization initiator.

In accordance with this invention, a polymer-coated powder of a transition metal compound is obtained by contacting a transition metal compound in powdered form with a vinyl monomer in an aqueous medium containing hydrogen sulfite ions.

Oxides, hydroxides, nitrides, carbides, silicides, sulfides, carbonates, sulfates, halides, double salts and complex salts of metals selected from the group consisting of silver, copper, zinc, titanium, zirconium, niobium, vanadium, chromium, tungsten, manganese, nickel and cobalt, which are insoluble or hardly soluble and stable in an aqueous medium, are especially preferred as the transition metal compound in this invention. As specific examples of these especially preferred transition metal compounds, there can be mentioned oxides, such as silver oxide, chromium oxide, cobalt oxide, zinc oxide, tungsten dioxide, copper oxide, titanium oxide, niobium oxide, vanadium pentoxide, zirconium oxide, manganese oxide and nickel oxide; the corresponding sulfides, carbides, nitrides and silicides; composite oxides, such as cobalt titanate and nickel vanadate; hydroxides, such as cupric hydroxide, nickel hydroxide and cobalt hydroxide; sulfates, such as cobalt sulfate, copper sulfate, manganese sulfate, nickel sulfate and zinc sulfate; and the corresponding carbonates and halides.

As the vinyl monomer to be used in this invention, there can be mentioned, for example, unsaturated carboxylic acids, such as acrylic acid and methacrylic acid; salts and esters of these unsaturated carboxylic acids; vinyl esters of fatty acids, such as vinyl acetate, vinyl propionate, vinyl laurate and vinyl stearate; dienes, such as chloroprene, butadiene and isoprene; olefins, such as 1-butene and 1-pentene; halogenated olefins, such as vinyl chloride and vinylidene chloride; styrenes, such as styrene, α-methylstyrene and pentachlorostyrene; heterocyclic vinyl compounds, such as 2-vinylpyridine and 2-vinylthiophene; vinyl ketones, such as methyl vinyl ketone and ethyl vinyl ketone; vinyl ethers, such as methyl vinyl ether and ethyl vinyl ether; and crosslinkable vinyl compounds, such as divinylbenzene and N-methylol acrylamide. These vinyl monomers can be used alone or in the form of mixtures of two or more. These vinyl monomers are generally used in amounts of 0.1 to 20 parts by weight per 100 parts by weight of the transition metal compound, but larger amounts can be used is desired.

In particular, the vinyl monomer can be an alkyl ester of acrylic acid or methacrylic acid, styrene, or a mixture of styrene with other comonomers.

In this invention, it is indispensable that hydrogen sulfite ions should be present in an aqueous medium to be used for the polymerization. This can be accomplished by incorporating in the polymerization medium a hydrogen sulfite ion-supplying substance, such as sulfur dioxide, an aqueous solution of sulfurous acid, a hydrogen sulfite and a combination of a sulfite and an acid. A preferred hydrogen sulfite ion-supplying substance is sulfur dioxide or an aqueous solution of sulfurous acid. The amount of the hydrogen sulfite-supplying substance is generally within a range of 0.01 to 100 parts by weight, calculated as sulfur dioxide, per 100 parts by weight of the vinyl monomer. It is possible to use larger amounts, but no particular advantage is attained.

In this invention, the polymerization is carried out in an aqueous medium. As the aqueous medium, water or a mixture of water and an alcohol is preferably employed. The polymerization can be conducted according to any solution polymerization, suspension polymerization and emulsion polymerization procedures.

The order of addition of the components is not particularly critical in the process of this invention, but generally a transition metal compound and a vinyl monomer are mixed in advance, and a hydrogen sulfite ion-supplying substance is added to initiate the polymerization. In this case, the reaction can be accelerated by heating, if desired. The polymerization generally lasts for 0.5 to 6 hours.

In the process of this invention, the transition metal compound per se forms a radical polymerization initiator together with hydrogen sulfite ions and polymerization of the vinyl monomer is advanced by virtue of the so-formed radical polymerization initiator. Therefore, the polymer is formed predominantly on surfaces of particles of the transition metal compound and, hence, transition metal compound particles closely and tightly coated with the polymer can be obtained.

In case the polymerization initiator of the present invention is used together with a known radical polymerization initiator, e.g., organic peroxide, polymerization of the monomer proceeds predominantly in the reaction medium rather than on the surface of the inorganic compound particles and, consequently, the amount of the polymer actually coated on the particles is very small and the bulk of the polymer does not participate in the coating.

In accordance with another embodiment of this invention, a hydrogen sulfite ion-supplying substance and a transition metal or a compound thereof are added to a mixture comprising an inert inorganic material itself substantially free of transition metal and a vinyl monomer to cause polymerization of the vinyl monomer, whereby the inert inorganic material can be coated with the resulting polymer.

The term "inert inorgaic material" is intended to mean that this material is substantially free of transition metal or any compound of such a metal in the sense that the material either does not contain a transition metal at all or in so small an amount as to be immaterial. Therefore, when such inert inorganic material is present with hydrogen sulfite ions, that mixture has no activity whatsoever to initiate polymerization of the vinyl monomer or, if it has such activity, it is so low as to give an insignificantly low polymerization rate. As examples of such inert inorganic material, there can be mentioned quartz sand, gypsum, calcium sulfite, calcium carbonate, silica gel, zeolite, aluminum and mixtures thereof.

As the transition metal to be incorporated with the inert inorganic material, there can be used, for example, titanium, vanadium, chromium, manganese, iron, cobalt, nickel, copper, zinc, zirconium and niobium. These transition metals can be used in the forms of such compounds as oxides, hydroxides and various salts. It is also possible to use these transition metals in the form of rocks, slag, ore, red mud, alloys and the like. The transition metal or compound is added in an amount of at least 0.01% by weight, preferably at least 0.5% by weight, as calculated as the metal, based on the inert inorganic material. There is no upper limit of the amount of the transition metal or compound and it may be used in much larger amounts, but in order to obtain a product composed mainly of the inert inorganic material, it is preferred that the amount of the transition metal or compound be less than 50% by weight.

In this invention, the order of addition of the components is not critical and any optional order can be adopted, but it is advantageous that the inert inorganic material is treated in advance with a transition metal or its compound and a vinyl monomer and a hydrogen sulfite ion-supplying substances are then added thereto to effect polymerization. In the case of silica gel, for example, it is possible to conduct the impregnation treatment with use of a solution of iron chloride.

In accordance with this invention, a degree of polymerization of 80% of higher can be obtained by conducting the polymerization for such a short time as 1 to 5 hours, and the coating of the inert inorganic material with a polymer can be accomplished very smoothly.

The polymer-coated inorganic material obtained according to this invention can be molded as is or after incorporation with a suitable filler or pigment. Therefore, it can be used effectively as a molding material. Moreover, it can be used broadly in various fields as a filler for plastics, a glaze for ceramics, a material for the preparation of catalysts, a material for preparing refractories and the like.

This invention will now be illustrated in further detail by reference to the following examples which are not intended to limit the scope of this invention.

EXAMPLE 1

A 100-ml capacity three-neck flask, immersed in a water tank maintained at 50°C, was charged with 100 ml of water, 10.0 g of an oxide of a size not larger than 100 mesh and identified in Table 1 and 2.0 g of a monomer indicated in Table 1, and 0.3 g of sulfurous acid gas was blown into the mixture over a period of 20 minutes under agitation to effect the reaction. After completion of the gas blowing, the reaction mixture was further agitated for 1 hour to advance the reaction. Then, the resulting slurry was filtered and the recovered solid was dried at 50°C under reduced pressure until its weight was stabilized. The results are shown in Table 1. When the thus-obtained dried products were observed under an electron microscope, it was found that in each product the polymeric material effectively covered the particle surfaces.

TABLE 1

| Run No. | Oxide | Monomer | (g) | Amount of Prod. (wt. %) | Polymer Content (g) | Amount of Polymer |
|---|---|---|---|---|---|---|
| 1 | AgO | Methyl methacrylate | | 11.02 | 14.7 | 1.62 |
| 2 | CrO | Methyl acrylate | | 11.70 | 14.5 | 1.70 |
| 3 | $Co_2O_3$ | Styrene/acrylonitrile | | 10.24 | 4.5 | 0.46 |
| 4 | $ZrO_3$ | Vinyl acetate | | 10.77 | 10.6 | 1.14 |
| 5 | $WO_2$ | Methyl methacrylate/ N-methylol acrylamide | | 11.65 | 14.2 | 1.66 |
| 6 | $TiO_2$ | Methyl methacrylate/ methyl acrylate | | 11.54 | 13.3 | 1.54 |

TABLE 1-continued

| Run No. | Oxide | Monomer | Amount (g) | Amount of Prod. (g) | Polymer Content (wt. %) | Amount of Polymer (g) |
|---|---|---|---|---|---|---|
| 7 | Cu$_2$O | Methyl methacrylate | | 11.48 | 15.0 | 1.70 |

EXAMPLE 2

A 100-ml capacity, three-neck flask immersed in a water tank maintained at 50°C was charged with 100 ml of water, 10.0 g of a powdery oxide of a size not larger than 100 mesh and identified in Table 2 and 2.0 g of methyl methacrylate, and 3.0 ml of a 1.7 N aqueous solution of sulfurous acid was added under agitation. The reaction was conducted for 2 hours, and the resulting slurry product was filtered. The recovered solid was dried at 50°C under reduced pressure until no further weight change occurred. The results are are shown in Table 2. When the thus obtained dried products were observed under an electron microscope, it was found that in each product the polymer effectively covered the particle surfaces.

TABLE 2

| Run No. | Oxide | Amount of Prod. (g) | Polymer Content (wt. %) | Amount of Polymer (g) |
|---|---|---|---|---|
| 8 | NbO | 11.30 | 11.5 | 1.30 |
| 9 | V$_2$O$_5$H$_2$O | 10.94 | 13.3 | 1.46 |
| 10 | MnO$_2$ | 11.26 | 13.5 | 1.52 |
| 11 | ZnO | 11.39 | 14.2 | 1.62 |
| 12 | NiO | 11.54 | 13.6 | 1.54 |
| 13 | CoTiO$_3$ | 11.63 | 14.3 | 1.66 |

EXAMPLE 3

A 100-ml capacity three-neck flask immersed in a water tank maintained at 50°C was charged with 40 ml of water, 5.0 g of powdery nickel hydroxide of a size not larger than 100 mesh and 5.4 g of methyl methacrylate, and 3.46 g of sulfurous acid gas was blown to the mixture under agitation over a period of 30 minutes to effect the reaction. The reaction mixture was further agitated for 1 hour and 30 minutes. The resulting slurry product was filtered, and dried at 50°C under reduced pressure until no further weight change occurred, whereby 9.09 g of a solid product was obtained. The polymer content in the resulting solid product was found to be 53.5% by weight.

EXAMPLE 4

Preparation of a polymer-coated powder of a transition metal compound was conducted in the same manner as in Example 3. More specifically, a 100-ml capacity, three-neck flask immersed in a water tank maintained at 50°C was charged with 100 ml of water, 10.0 g of a powdery hydroxide of a size not larger than 100 mesh and identified in Table 3 and 2.0 g of methyl methacrylate, and 0.5 g of sulfurous acid gas was blown into the mixture under agitation over a period of 15 minutes. Then, the reaction mixture was further agitated for 1 hour and 45 minutes. The resulting slurry product was filtered and dried at 50°C under reduced pressure until no further weight change occurred. The results are shown in Table 3. When the thus obtained dried products were observed under an electron microscope, it was found that in each product the polymer effectively covered the hydroxide surface.

TABLE 3

| | Run No. 14 | Run No. 15 |
|---|---|---|
| Hydroxide | Co(OH)$_2$ | Cr(OH)$_3$ |
| Amount of Product (g) | 11.36 | 10.37 |
| Polymer Content (wt. %) | 15.5 | 13.5 |
| Amount of Polymer (g) | 1.76 | 1.40 |

EXAMPLE 5

A 100-ml capacity, three-neck flask immersed in a water tank maintained at 50°C was charged with 100 ml of methanol, 10.0 g of a water-soluble or water-insoluble inorganic salt of a size not larger than 100 mesh and identified in Table 4 and 2.0 g of methyl methacrylate, and 5.0 ml of a 1.7 N aqueous solution of sulfurous acid was added to the mixture under agitation. In this state, the reaction was conducted for 24 hours. The resulting slurry product was filtered and dried at 50°C under reduced pressure until no further weight change occurred. The results are shown in Table 4. When the thus obtained dried products were observed under electron microscope, it was found that in each product the polymer effectively covered the surfaces of the inorganic salt particles.

TABLE 4

| Run No. | Inorg. Salt | Amount of Prod. (g) | Polymer Content (wt. %) | Amount of Polymer (g) |
|---|---|---|---|---|
| 16 | CoSO$_4$ | 10.93 | 12.2 | 1.33 |
| 17 | CuSO$_4$ | 9.03 | 15.9 | 1.44 |
| 18 | MnSO$_4$ | 11.17 | 10.9 | 1.22 |
| 19 | NiSO$_4$ | 11.32 | 12.8 | 1.45 |
| 20 | ZnSO$_4$ | 10.86 | 11.6 | 1.26 |
| 21 | CoCO$_3$ | 11.03 | 9.5 | 1.05 |

EXAMPLE 6

3-Liter capacity, three-neck flasks immersed in a water tank maintained at 50°C were respectively charged with 400 g each of the following inert inorganic materials - calcium sulfite (less than 150 mesh), sea sand having a quartz content higher than 99.5% (less than 200 mesh), aluminum oxide (less than 200 mesh) and gypsum dihydrate (100 mesh), and 5 g of a transition metal or one of the following transition metal compounds -oxide, copper powder (100 mesh) zircon sand (less than 100 mesh) and nickel oxide, plus a prescribed amount of a vinyl monomer indicated in Table 5 and 1.6 Kg of water. Then, nitrogen was blown into the mixture for 15 minutes and 100 ml of a 1 N aqueous solution of sulfurous acid was added to the mixture. The polymerization was conducted in the thusformed nitrogen atmosphere under agitation. When 2 hours or 4 hours had passed from addition of the sulfurous acid aqueous solution, 1 g of hydroquinone was added to the reaction mixture, and the product was recovered by filtration, washed sufficiently with water and vacuum-dried at 130°C. Data of the degree of polymerization in the resultant product are shown in Table 5.

For comparison, the polymerization was carried out without employing the transition metal or a compound thereof and the results are also shown in Table 5.

Each of the products was compression molded at 180°C under 200 Kg/cm$^2$ and the flexural strength of the molded article was determined to obtain the values shown in Table 5.

duced pressure to obtain 450.2 g of a dry solid in which the polymer content was 14.7% by weight. In the resultant product, the coating condition was very good.

What is claimd is:

1. A method of producing vinyl-polymer coated inorganic material which comprises contacting a powdery inorganic material consisting essentially of at least about 0.5% by weight of a transition metal compound and the balance of an inert inorganic material, the weight of said transition metal compound being calculated as a metal based on the inert inorganic material,

TABLE 5

| Run No. | Inert Inorganic Compound | Starting Materials Trans. Metal Cpd. | Monomer[1] | (g) | Polym. Time | Degree of Polym. (%) | Coating Condition | Flexural Strength (Kg/cm$^2$) |
|---|---|---|---|---|---|---|---|---|
| 22 | Calcium sulfite | — | MMA | 40 | 4 | 26 | Bad | 41.0 |
| 23 | Calcium sulfite | Iron red oxide | MMA | 40 | 2 | 80 | Good | 170.0 |
| 24 | Sea sand | — | MMA AM | 35 5 | 2 | 41 | Slightly Bad | 65.0 |
| 25 | Sea sand | Copper powder | MMA AM | 35 5 | 2 | 91 | Good | 221.0 |
| 26 | Aluminum oxide | — | MMA St DVB | 5 20 5 | 4 | 7 | Bad | 12.0 |
| 27 | Aluminum oxide | Zircon sand | MMA St DVB | 5 20 5 | 4 | 78 | Good | 181.0 |
| 28 | Gypsum dihydrate | — | VAc | 40 | 2 | 4 | Slightly Bad | — |
| 29 | Gypsum dihydrate | Nickel oxide | VAc | 40 | 2 | 65 | Good | — |

[1]MMA = Methyl methacrylate;
AM = Methyl acrylate;
St = styrene;
DVB = Divinyl benzene;
VAc = Vinyl acetate

EXAMPLE 7

200 g of glass fiber powder (200 mesh), 200, g of aluminum oxide ($\gamma$-Al$_2$O$_3$ having a purity higher than 99.9%), 5 g of red iron oxide, 80 g of methyl methacrylate and 1.6 Kg of water were mixed, and 100 ml of a 1 N aqueous solution of sulfurous acid was added to the mixture. Under the same conditions described in Example 6, the polymerization was carried out at 50°C under agitation for 2 hours to obtain a product of a good quality coating in which the degree of polymerization was 92% and the polymer content was 15.4% by weight.

The flexural strength of a molded product obtained by compression molding of the above-coated product at 200°C under 200 Kg/cm$^2$ was 212 Kg/cm$^2$.

EXAMPLE 8

A 3-liter capacity, three-neck flask immersed in a water tank maintained at 50°C as charged with 1.6 Kg of water, 200 g of powdery gypsum dihydrate, 200 g of powdery calcium sulfite, 5.0 g of powdery cobalt oxide and 80 g of methyl methacrylate, and 5.0 g of sulfurous acid gas was blown into the mixture under agitation over a period of 30 minutes. Then, the reaction mixture was further agitated for 1½ hours to advance the reaction. The resulting slurry product was filtered, washed sufficiently with water and dried at 100°C under rewith a coating material which comprises at least about 0.1 part by weight per 100 parts of weight of said transition metal compound of a vinyl monomer in an aqueous polymerization medium containing a polymerization initiator consisting essentially of hydrogen sulfite ions of the formula HSO$_3^-$ in the amount, calculated as sulfur dioxide, of about 0.01-100 parts by weight per 100 parts by weight of said monomer, whereby said monomer polymerizes in said medium as a coating on said powdery material, and recovering the coated powdery material.

2. The method of claim 1 wherein said polymerization is carried out for at least about 0.5 hours.

3. The method of claim 1 wherein said polymerization is accelerated by heating said medium.

4. The method of claim 1 wherein at least about 0.5 but less than about 50% by weight of said transition metal compound is present in said powdery material.

5. A method according to claim 1 wherein said vinyl monomer is an alkyl ester of acrylic acid or methacrylic acid, styrene or a mixture of styrene with another vinyl comonomer.

6. A method according to claim 1 wherein said hydrogen sulfite ion-containing aqueous medium is an aqueous solution of sulfur dioxide.

7. A method according to claim 1 wherein said vinyl monomer is vinyl acetate.

* * * * *